US007429335B2

(12) United States Patent
Buswell

(10) Patent No.: US 7,429,335 B2
(45) Date of Patent: Sep. 30, 2008

(54) SUBSTRATE PASSAGE FORMATION

(76) Inventor: Shen Buswell, 1699 Teton Dr., Monmouth, OR (US) 97361

( * ) Notice: Subject to any disclaimer, the term of this patent is extended or adjusted under 35 U.S.C. 154(b) by 469 days.

(21) Appl. No.: 10/834,462

(22) Filed: Apr. 29, 2004

(65) Prior Publication Data

US 2005/0242057 A1 Nov. 3, 2005

(51) Int. Cl.
*G11B 5/27* (2006.01)
*H01B 13/00* (2006.01)

(52) U.S. Cl. .............................. 216/27; 216/17; 347/54

(58) Field of Classification Search ................... 216/27, 216/17; 347/54
See application file for complete search history.

(56) References Cited

U.S. PATENT DOCUMENTS

| | | | | | |
|---|---|---|---|---|---|
| 3,823,514 | A | * | 7/1974 | Tsuchiya | 451/36 |
| 4,169,008 | A | * | 9/1979 | Kurth | 216/27 |
| 4,430,784 | A | * | 2/1984 | Brooks et al. | 29/890.1 |
| 4,733,823 | A | * | 3/1988 | Waggener et al. | 239/601 |
| 4,789,425 | A | | 12/1988 | Drake et al. | |
| 4,791,436 | A | | 12/1988 | Chan et al. | |
| 4,863,560 | A | * | 9/1989 | Hawkins | 216/27 |
| 4,899,178 | A | * | 2/1990 | Tellier | 347/65 |
| 5,006,202 | A | | 4/1991 | Hawkins et al. | |
| 5,204,690 | A | * | 4/1993 | Lorenze et al. | 347/93 |
| 5,291,226 | A | | 3/1994 | Schantz et al. | |
| 5,408,738 | A | | 4/1995 | Schantz et al. | |
| 5,441,593 | A | * | 8/1995 | Baughman et al. | 216/27 |
| 5,443,713 | A | | 8/1995 | Hindman | |
| 5,648,804 | A | | 7/1997 | Keefe et al. | |
| 5,658,471 | A | | 8/1997 | Murthy et al. | |
| 5,685,074 | A | | 11/1997 | Pan et al. | |
| 5,697,144 | A | | 12/1997 | Mitani et al. | |
| 5,755,032 | A | | 5/1998 | Pan et al. | |
| 5,850,241 | A | | 12/1998 | Silverbrook | |
| 5,871,656 | A | | 2/1999 | Silverbrook | |
| 6,022,482 | A | | 2/2000 | Chen et al. | |
| 6,107,209 | A | | 8/2000 | Ohkuma | |
| 6,113,222 | A | | 9/2000 | Ohkuma | |
| 6,130,688 | A | | 10/2000 | Agarwal et al. | |
| 6,132,028 | A | | 10/2000 | Su et al. | |
| 6,139,761 | A | | 10/2000 | Ohkuma | |
| 6,238,269 | B1 | | 5/2001 | Pollard et al. | |
| 6,290,331 | B1 | | 9/2001 | Agarwal et al. | |
| 6,290,337 | B1 | | 9/2001 | Radke | |

(Continued)

FOREIGN PATENT DOCUMENTS

EP 0401996 A2 12/1990

(Continued)

OTHER PUBLICATIONS

S. Wolf and R.N. Ttauber, Silicon Processing for the VLSI Era, vol. 1- Process Technology, Lattice Press, 1986, p. 532.*

(Continued)

*Primary Examiner*—Nadine Norton
*Assistant Examiner*—Mahmoud Dahimene

(57) ABSTRACT

A method for forming an opening through a substrate includes removing a first portion of a first face of a substrate to form a first recessed surface oblique to the first face and removing a second portion of the substrate to form a passage extending through the substrate such that the passage is bordered by the first surface.

55 Claims, 8 Drawing Sheets

U.S. PATENT DOCUMENTS

| | | | | |
|---|---|---|---|---|
| 6,305,774 | B1 | 10/2001 | Torgerson et al. | |
| 6,454,393 | B2 | 9/2002 | Chen et al. | |
| 6,482,574 | B1 | 11/2002 | Ramaswami et al. | |
| 6,527,369 | B1 | 3/2003 | Weber et al. | |
| 6,666,546 | B1 | 12/2003 | Buswell et al. | |
| 6,766,817 | B2 | 7/2004 | da Silva | |
| 6,776,916 | B2 * | 8/2004 | Hess | 216/27 |
| 6,984,583 | B2 * | 1/2006 | Farnworth | 438/637 |
| 2004/0029481 | A1 * | 2/2004 | Gross et al. | 445/23 |
| 2004/0055145 | A1 * | 3/2004 | Buswell | 29/611 |
| 2004/0174407 | A1 * | 9/2004 | Hayakawa et al. | 347/20 |
| 2005/0093912 | A1 * | 5/2005 | Vaideeswaran et al. | 347/20 |

FOREIGN PATENT DOCUMENTS

| | | | |
|---|---|---|---|
| EP | 0841167 | A2 | 5/1998 |
| EP | 0964440 | A2 | 12/1999 |
| EP | 1138491 | A2 * | 4/2001 |
| EP | 1138491 | A2 * | 10/2002 |
| EP | 0885725 | B1 | 3/2004 |
| WO | WO00/00354 | | 1/2000 |
| WO | WO01/83220 | A1 | 11/2001 |

OTHER PUBLICATIONS

□□S. Wolf and R.N. Tauber, (Silicon Processing for the VLSI Era, vol. 1- Process Technology, Lattice Press, 1986, p. 532.*

* cited by examiner

SUBSTRATE PASSAGE FORMATION

BACKGROUND OF THE INVENTION

Fluid ejection devices, such as printheads, frequently include a slotted substrate through which the fluid flows. Existing slotting techniques substantially weaken the substrate, leading to cracks and a high failure rate. Existing slotting techniques are also time consuming and expensive. Therefore, there exists a need to solve one or both of these problems.

DETAILED DESCRIPTION OF EXAMPLE EMBODIMENTS

Figure 1:
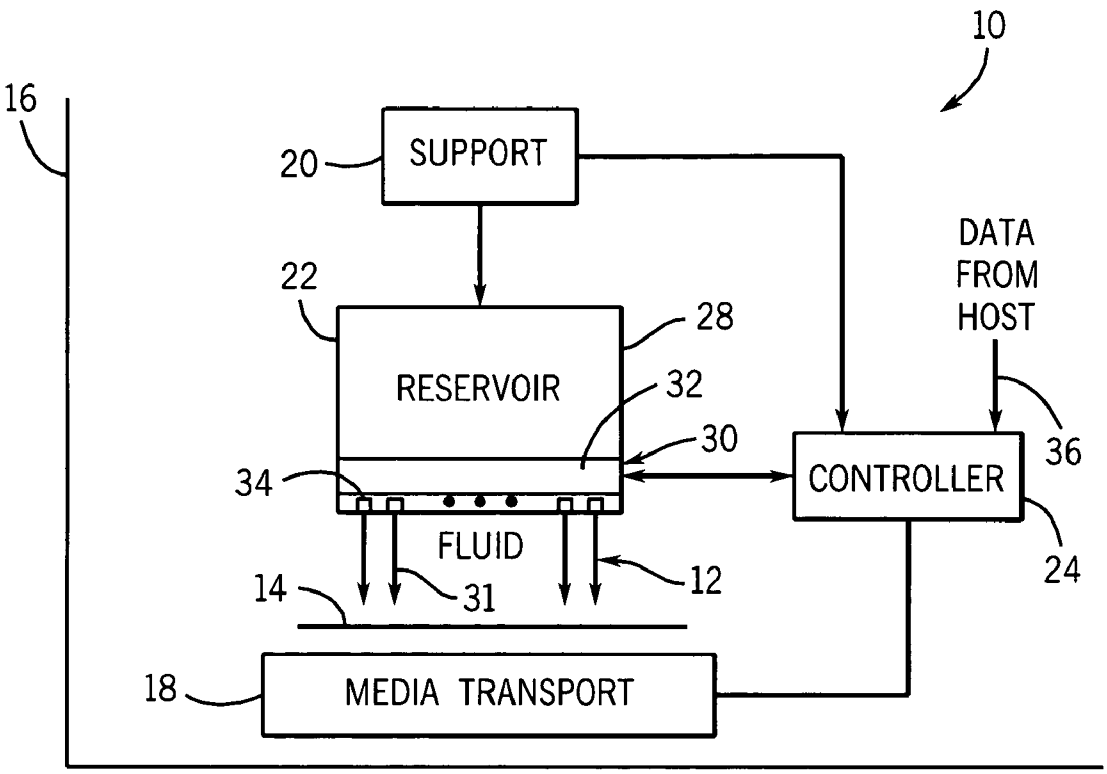
FIG. 1 is a schematic illustration of a fluid ejection system according to one exemplary embodiment.

FIG. 1 schematically illustrates fluid deposition system 10 configured to deposit a fluid 12 upon a medium 14. Fluid 12 comprises a liquid material, such as ink, which creates an image upon medium 14. In other applications, fluid 12 may include or carry non-imaging materials, wherein system 10 is utilized to precisely and accurately distribute, proportion and locate materials along medium 14.

Medium 14 comprises a structure upon which fluid 12 is to be deposited. In one embodiment, medium 14 comprises a sheet or roll of cellulose-based or polymeric-based materials. In other applications, medium 14 may comprise other structures which are more 3-dimensional shape and which are formed from one or more other materials.

Fluid deposition system 10 generally includes housing 16, media transport 18, support 20, fluid depositing device 22 and controller 24. Media transport 18 comprises a device configured to move medium 14 relative to fluid ejection system 22. Transport 20 comprises one or more structures configured to support and position fluid ejection system 22 relative to media transport 18. In one embodiment, support 20 is configured to stationarily support fluid depositing device 22 as media transport 18 moves medium 14. In such an embodiment, commonly referred to as a page-wide-array printer, fluid depositing device 22 may substantially span a dimension of medium 14.

In another embodiment, support 22 is configured to move fluid depositing device 22 relative to medium 14. For example, support 20 may include a carriage coupled to fluid depositing device 22 and configured to move device 22 along a scan axis across medium 14 as medium 14 is moved by media transport 18. In particular applications, media transport 18 may be omitted wherein support 20 and fluid depositing device 22 are configured to deposit fluid upon a majority of the surface of medium 14 without requiring movement of medium 14.

Fluid depositing device 22 is configured to deposit fluid 12 upon medium 14. Device 22 includes fluid reservoir 28 and fluid ejection mechanism 30. Fluid reservoir 28 comprises one or more structures configured to house and contain fluid 12 prior to fluid 12 being deposited upon medium 14 by ejection mechanism 30. In one embodiment, fluid reservoir 28 includes a single chamber containing a single type of fluid. In yet another embodiment, fluid reservoir 28 includes a plurality of distinct chambers containing one or more different fluids, such as one or more distinct inks. In particular embodiments, fluid reservoir 28 contains a fluid absorbent material, such as a porous mass, which absorb and wick fluid 12 towards ejection mechanism 30 and which regulate the pressure of the supply of fluid 12 being delivered to mechanism 30.

Fluid ejection mechanism 30 comprises a mechanism configured to selectively deposit or apply fluid 12 supplied to it from reservoir 28 upon medium 14. Fluid ejection mechanism 30 is coupled to fluid reservoir 28 proximate to medium 14. For purposes of this disclosure, the term "coupled" shall the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. In one embodiment, ejection mechanism 30 is permanently fixed to reservoir 28. In another embodiment, mechanism 30 is releasably or removably coupled to reservoir 28.

Fluid ejection mechanism 30 includes substrate 32 and fluid ejectors 34. Substrate 32 generally comprises a structure configured to support or serve as a base for the remaining elements of mechanism 30. Substrate 32 substantially extends between reservoir 28 and ejectors 34 and includes one or more openings though which fluid flows from reservoir 28 to one or more of ejectors 34. As will be described in greater detail hereafter, substrate 32 enables fluid ejectors 34 to be more closely and compactly located along substrate 32 while providing superior fluid flow to such ejectors 34 for higher fluid deposition resolutions and greater deposition speeds.

Fluid ejectors 34 generally comprise devices configured to eject fluid upon medium 14. Fluid ejectors 34 receive fluid from reservoir 28 through openings within substrate 32. Fluid ejectors 34 are carried by and formed upon substrate 32. Ejectors 34 selectively deposit fluid 12 upon medium 14 in response to control signals from controller 24.

Controller 24 generally comprises a processor configured to generate control signals which direct the operation of the media transport 18, support 20 and fluid ejection mechanism 30 of fluid depositing device 22. For purposes of this disclosure, the term "processor unit" shall mean a conventionally known or future developed processing unit that executes sequences of instructions contained in a memory. Execution of sequences of instructions cause the processing unit to perform steps such as generating control signals. The instructions may be loaded in a random access memory (RAM) for execution by the processing unit from a read only memory (ROM), a mass storage device, or some other persistent storage or computer or processor readable media. In other embodiments, hardwired circuitry may be used in place of or in combination with software instructions to implement the functions described. Controller 24 is not limited to any specific combination of hardware circuitry and software, nor to any particular source for the instructions executed by the processing unit.

As indicated by arrow 36, controller 24 receives data signals representing an image or deposition pattern of fluid 12 to be formed on medium 14 from one or more sources. The source of such data may comprise a host system such as a computer or a portable memory reading device associated with system 10. Such data signals may be transmitted to controller 24 along infrared, optical, electric or by other communication modes. Based upon such data signals, controller 24 generates control signals that direct the movement of medium 14 by transport 18, that direct the positioning of fluid depositing device 22 by support 20 (in those embodiments in which support 20 moves device 22) and that direct the timing at which drops 31 of ink 12 are ejected by ejectors 34 of ejection mechanism 30.

Although fluid depositing device 22 of system 10 is illustrated as including a single reservoir 28 and a single ejection mechanism 30, fluid depositing device 22 may include a plurality of reservoirs 28 and/or a plurality of ejection mechanisms 30. For example, in other embodiments, depositing device 22 may include a single reservoir 28 and a plurality of fluid ejection mechanisms 30 associated with the single reservoir 28. In other embodiments, device 22 may include a plurality of reservoirs 28 coupled to a single substrate 32 of a single fluid ejection mechanism 30. In still other embodiments, multiple reservoirs and multiple fluid ejection mechanism 30 may be employed.

Figure 2:
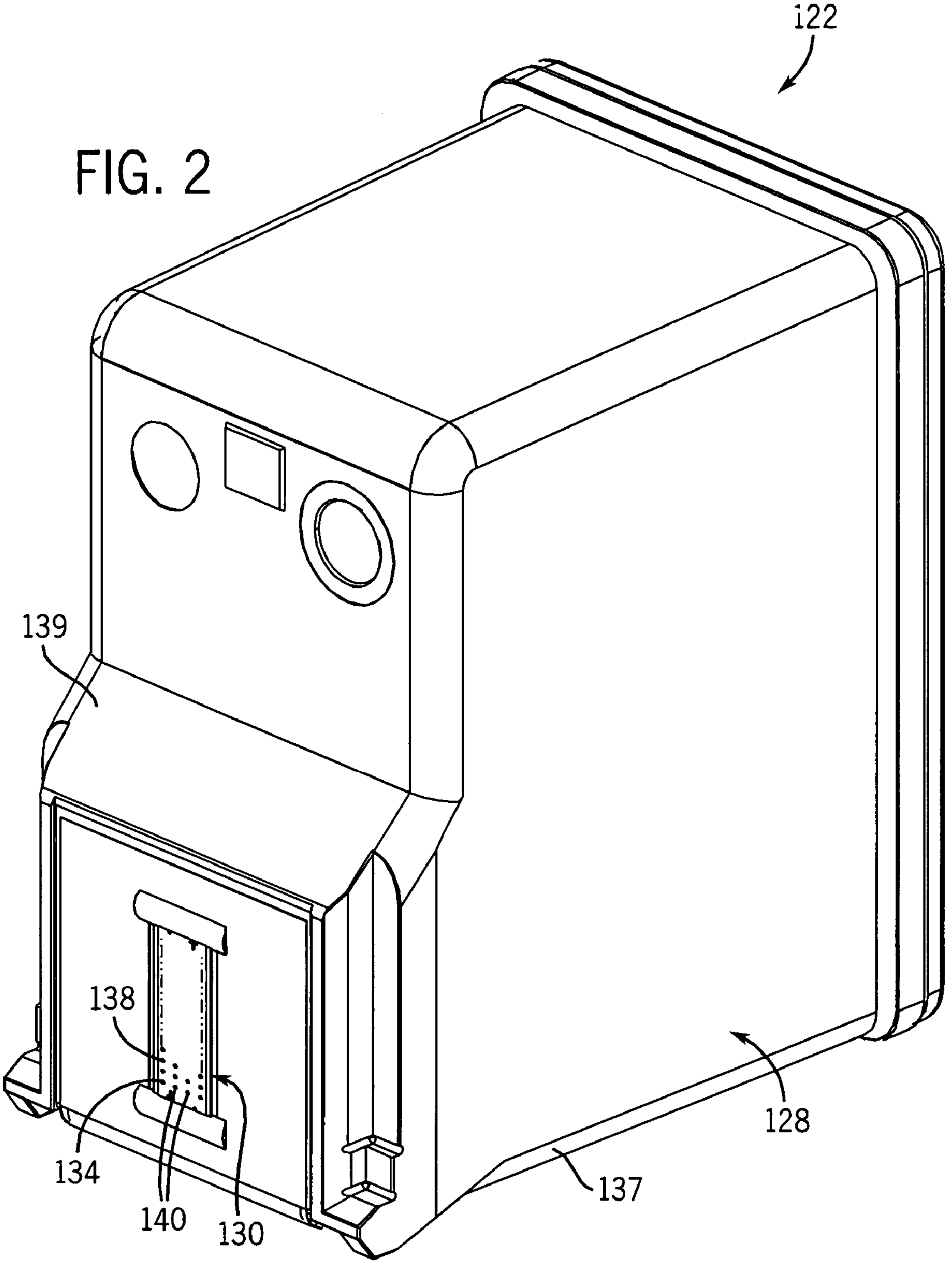
FIG. 2 is a perspective view of a fluid ejection device of the system of FIG. 1 according to one exemplary embodiment.

FIG. 2 is a perspective view of a fluid depositing device 122, one example of fluid depositing device 22 described with respect to FIG. 1. Fluid depositing device 122 generally comprises a print cartridge configured to deposit ink or other fluid upon a medium. Device 122 includes fluid reservoir 128 and fluid ejection mechanism 130. Fluid reservoir 128 includes a main body portion 137 and a snout portion 139. Main body portion 137 and snout portion 139 form an interior containing a fluid such as ink. Main body portion 137 is configured to be removably retained by a carriage for being positioned relative to a print medium. Snout portion 139 extends from main body portion 137 and is configured to extend towards a print medium. Snout portion 139 supports fluid ejection mechanism 130.

Fluid ejection mechanism 130 comprises a printhead configured to draw fluid from main body portion 137 and snout portion 139 of reservoir 128 and to selectively eject ink or other fluid upon a print medium. As shown by FIG. 2, ejection mechanism 130 includes a multitude of fluid ejectors 134 having ejection orifices 138 arranged in rows 140. Fluid ejectors 134 selectively eject fluid through ejection orifices 138.

Figure 3:
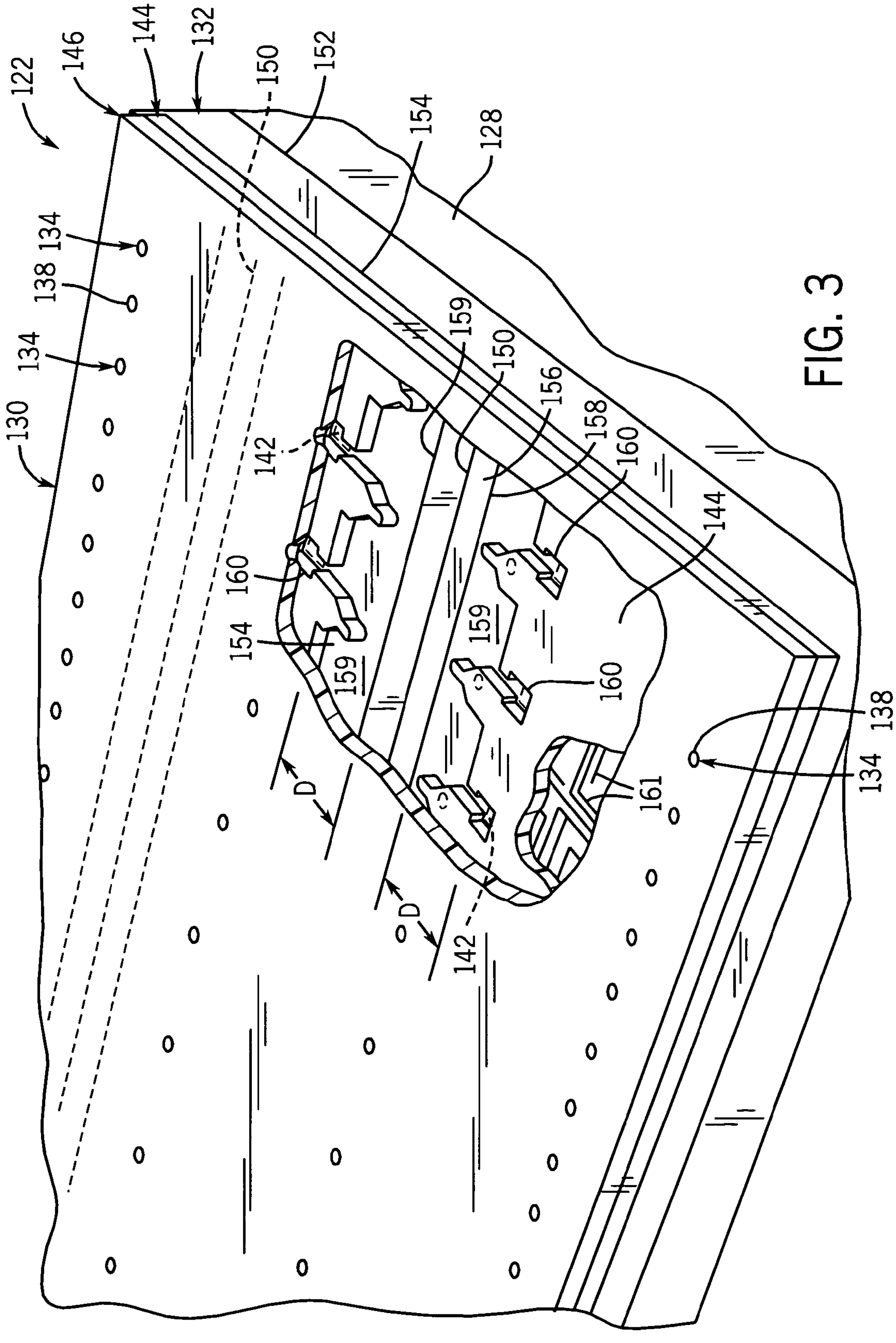
FIG. 3 is an enlarged fragmentary perspective view of a fluid ejection device of FIG. 2 with portions removed for purposes of illustration according to one exemplary embodiment.

FIG. 3 illustrates fluid ejection mechanism 130 in greater detail. FIG. 3 is an unscaled, fragmentary schematic perspective view of mechanism 130 with portions broken away for purposes of illustration. As shown by FIG. 3, mechanism 130 includes substrate 132 and fluid ejectors 134 provided by fluid drivers 142, layer 144 and orifice layer or plate 146. Although not illustrated, mechanism 130 may include additional layers of adhesives or thin films between substrate 132 and barrier 144 or between barrier 144 and orifice plate 146.

Substrate 132 comprises a thin film substrate configured to support fluid drivers 142 and barrier 144. Substrate 132 is formed from a dielectric material such as silicon, glass, ceramics and the like. Substrate 132 includes a plurality of fluid passages 150 which extend through substrate 132 from a reservoir side 152 to a thin film or ejection side 154 of substrate 132. In the particular embodiment shown, substrate 132 includes a plurality of parallel passages 150. In other embodiments, substrate 132 may additionally include passages 150 which are in series or end-to-end.

As further shown by FIG. 3, face 152 of substrate 132 is generally coupled to reservoir 128 while face 154 supports fluid drivers 142 and barrier 144. Each passage 150 provides fluid communication between an outlet of reservoir 128 fluid drivers 142. In particular, passages 150 have inlets along side or face 152 which are in fluid communication with an outlet of reservoir 128. Each passage 150 has an outlet 156 through which fluid flows from each passage 152 to one or more of fluid drivers 142. For purposes of the disclosure, the term "in fluid communication" means any two volumes having one or more fluid channels, passages and the like therebetween allowing fluid to flow between such volumes.

Fluid drivers 142 comprise elements configured to drive or move fluid through orifices 138 upon being selectively energized. In the embodiment shown, fluid drivers 142 comprise resistors configured to heat fluids so to cause the fluid to be ejected through an associated orifice 138. In other embodiments, fluid drivers 142 make comprise other heating elements. In still other embodiments, fluid drivers 142 may be configured to drive fluid through orifices 138 by other means such as vibration or pumping motion.

Fluid drivers 142 are spaced from edges 158 of inlet passages 150 by a distance D along a shelf 159. Fluid drivers 142 are further electrically connected to an electrical power source via one or more electrical traces formed upon face 154 of substrate 132. In particular embodiments, face 154 of substrate 132 may additionally include control mechanisms for assisting in selective energization of fluid drivers 142. Examples of such control mechanisms include FET drive transistors.

Barrier 144 generally comprises one or more layers of one or more materials formed upon or secured to face 154 of substrate 132. In one embodiment, barrier 144 comprises a polymer. For example, barrier 144 may comprise an acrylate based photo polymer dry film such as "Parad" brand photo polymer dry film obtainable from E. I. DuPont De Nemours, a company of Bloomington, Del. Other similar dry films include "Riston" brand dry film and dry films made by other chemical providers.

Barrier 144 forms individual firing chambers 160 about individual fluid drivers 142. Chambers 160 receive fluid after it has passed through passages 150 and assist in controlling the amount of fluid ejected through orifice 138 upon energization of an associated driver 142. Barrier 144 further covers and protects the underlying electrical traces and other electrical components 161 upon face 154 from contact with the fluid. Although barrier 144 is illustrated as having a particular configuration, barrier 144 may have a variety of alternative configurations depending upon characteristics of the fluid to be ejected, the specific characteristics of fluid drivers 142 and the number and spacing of orifices 138.

Orifice layer 146 (also known as an orifice plate or nozzle plate) comprises a layer of one or more materials extending across barrier 144 and providing orifices 138. Orifices 138 comprise openings which pass through orifice layer 146 and are in at Least partial alignment with corresponding chambers 160 and fluid drivers 142. in the embodiment shown, orifice layer 146 comprises a planar substrate including a polymer material in which orifices are formed by laser ablation, for example, as disclosed in U.S. Pat. No. 5,469,199, the full disclosure of which is hereby incorporated by reference, in another embodiment, the polymer material can be light sensitive polymer such as SU8 and the orifices can be formed by method of photolithography described in Chapter One of "Fundamentals of microfabrication, Second Edition" by Marc J. Madou, the full disclosure of which is hereby incorporate by reference. Orifice layer 146 may alternatively comprise a plated metal such as nickel and orifices 138 may be formed by electric plating methods. Each orifice 138, its associated underlying chamber 160 and its associated underlying driver 142 forms a fluid ejector 134 which generates drops of fluid that are ejected through orifice 138.

In operation, fluid passes through an outlet (not shown) formed within snout 139 of reservoir 128 into an inlet of fluid passage 150 adjacent face 152. The fluid flows through fluid passages 150 and out of outlet 156 on face 154 of substrate 132. The fluid flows across shelf 159 into chambers 160 adjacent to fluid drivers 142. A controller, such as controller 24 described above with respect to FIG. 1, generates control signals which cause selective energization of particular fluid drivers 142. Energization of fluid drivers 142 causes the fluid within chamber 160 to be ejected through an associated orifice 138 onto the print medium.

In the particular embodiment illustrated, edges 158 of outlet 156 are uniform in shape and are smooth. In addition, such edges 158 are relatively robust against cracking or other surface deformities. As a result, fluid drivers 142 and their associated chambers 160 are more closely spaced to edges 158, reducing shelf distance D. In particular, fluid drivers 142 and their associated chambers 160 are spaced from adjacent edges 158 by a shelf distance D of no greater than 100 microns. In one particular embodiment, the proximate edge of each of fluid drivers 142 is spaced from an adjacent edge 158 by a shelf distance D of no greater than 50 microns. This reduced shelf distance D enables fluid drivers 142 to be more closely and compactly arranged along face 154 of substrate 132, reducing the size and cost of ejection mechanism 130 while increasing resolution of mechanism 130. In addition, because shelf distance D is reduced, chambers 160 are more quickly refilled with fluid, increasing the rate at which fluid may be ejected by mechanism 130 (i.e., print speed).

Figure 4A:
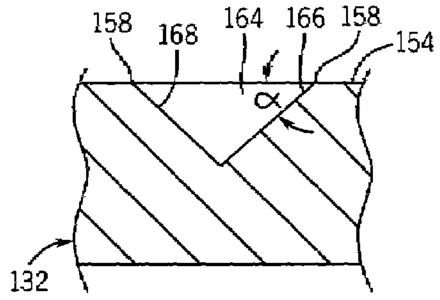
FIG. 4A is a fragmentary sectional view illustrating formation of a first trench in a substrate according to one exemplary embodiment.
Figure 4B:
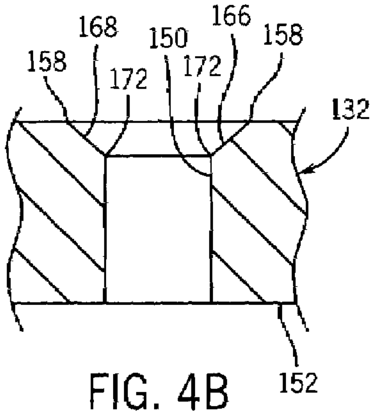
FIG. 4B is a fragmentary sectional view illustrating formation of a passage in the substrate in FIG. 4A according to one exemplary embodiment.
Figure 4C:
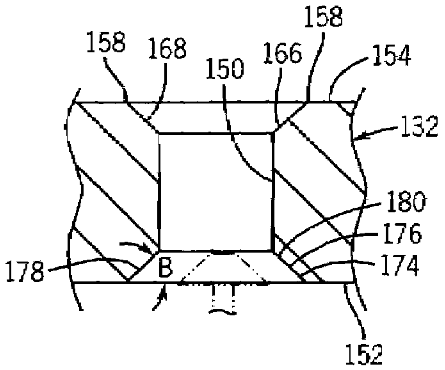
FIG. 4C is a fragmentary sectional view illustrating formation of a second trench in the substrate of FIG. 4B according to one exemplary embodiment.

FIGS. 4A-4C illustrate one method for forming a passage 150 having such robust and consistent edges 158 according to one embodiment. As shown by FIG. 4A, the method includes removing a first portion of substrate 132 along face 154 to form a trench 164 having recessed surfaces 166 and 168. Surfaces 166 and 168 substantially face one another and provide edges 158. Trench 164 has a depth sufficient to reduce then likelihood of chipping at edges 158 during subsequent formation of passage 150 (shown in FIG. 4B). In one embodiment, surfaces 166 and 168 extend at an angle relative to surface 154. In several embodiments, surfaces 166 and 168 extend at angles of between about 40 degrees and 75 degrees and nominally at about 55 degrees. In one embodiment, trench 164 is formed by etching face 154. In one application, a wet etch is utilized. One example of a wet etch process is a TMAH anisotropic etching as described on page 188 of *Fundamentals of Microfabrication*, Second Edition (2002), by Marc J. Madou, the entirety of which is incorporated by reference. In another embodiment, a dry etch is utilized. In still other embodiments, other material removal techniques may be employed.

As shown by FIG. 4B, the method further includes removing a second portion to form passage 150 according to one embodiment. Passage 150 is bordered by portions of surfaces 166 and 168 previously formed by the formation of trench 164. Passage 150 extends through substrate 132 to face 152. In one embodiment, passage 154 is formed by cutting material away with a cutting device such as a saw. In other embodiments, other material removal techniques may alternatively be employed to form passage 150 such as abrasive jet machining (AJM), wet etch, and dry etch.

According to one embodiment, trench 164 is formed using a first material removal technique which imposes less stress upon substrate 132 than a second distinct material removal technique, which may be generally faster and/or less expensive, to form passage 150. According to one embodiment, trench 164 is formed using a dry or wet etching process, while passage 150 is formed using a saw. Because edges 158 are formed using the less stress imposing etching process, the probability that edges 158 may chip or crack is reduced. Further, an etching process may be precisely controlled for accuracy and smoothness to allow control over the angles which at surfaces 166 and 168 extend from edges 158. At the same time, passage 150 is formed by sawing through substrate 132. Sawing can be quickly and inexpensively performed without subjecting substrate 132 to substantial heat. Although sawing imposes stresses upon substrate 132, because passage 150 formed by such sawing is already bordered by recessed surfaces 166 and 168, edges 172 of the portion removed by sawing are spaced from edges 158 that recessed surfaces 166 and 168. Moreover, because surfaces 166 and 168 are tapered relative to the sides of portion 170, the stresses at edges 172 and 158 are minimized.

In one particular embodiment, trench 164 is an elongate recess while passage 150 is a slot extending through substrate 132 and formed within trench 164. The length of trench 164 and passage 150 can be between 5.0 mm to 1000 mm and nominally about 30 mm. In one particular embodiment, trench 164 is substantially V-shaped. Because the resulting recessed surfaces 166 and 168 of trench 164 extend oblique to face 154, stresses along the junction of trench 164 and passage 150 (i.e., edges 172) during the formation of passage 150 are reduced, reducing potential weakening of substrate 132 during the formation of passage 150. Although the method is illustrated as forming a substantially V-shaped trench 164, trench 164 may alternatively have a flat or rounded surface that substantially opposes face 154. In such embodiments, trench 164 may have sides which are not tapered relative to face 154, e.g. wherein edges 158 and 172 are separated by a step. Although passage 150 is illustrated as having substantially linear sides perpendicular to surface 152, passage 150 may alternatively have converging or diverging sides. In one particular embodiment, passage 150 is formed by cutting from face 154 towards face 152. As a result, precise alignment of passage 150 relative to edges 158 is more easily achieved, reducing the likelihood of misalignment and the imposition of excess stress upon one of edges 158. In other embodiments, passage 150 may be formed by cutting from 152 towards face 154.

FIG. 4C illustrates removal of material along face 152 to form a recess or trench 174 having recessed surfaces 176 and 178 according to one embodiment. Recessed surfaces 176 and 178 extend from face 152 towards face 154 at an angle relative to face 152. In the particular embodiment shown, surfaces 176 and 178 extend at an angle of about 15 degrees to 75 degrees and nominally of about 45 degrees. Surfaces 176 and 178 form an inlet 179 for passage 150, facilitating improved fluid flow into passage 150 from reservoir 128 (shown in FIG. 3).

In the particular embodiment shown, trench 174 is removed using a router. Alternatively, portion 174 may be removed using other various material removal techniques such as abrasive jet machining (AJM), abrasive flow machining (AFM), wet etch, and dry etch. Use of a router enables trench 174 to be quickly, easily and inexpensively removed. Although the use of a router may subject surface 152 to surface stresses, deminimus chipping of surface 152 is tolerable since surface 152 merely extends opposite reservoir 128 and does not form a shelf upon which the components of mechanism 130 are deposited.

According to one exemplary embodiment, trench 164 (shown in FIG. 4A) and passage 150 are formed after conductive traces 161 and other components have been formed upon substrate 132. Trench 164 at passage 150 are also formed while resistors 142 and barrier 144 are already coupled to face 154 of substrate 132. In one embodiment, substrate 132 has a thickness of between 200 microns to 5000 microns and nominally of 675 microns. The trench 164 is substantially V-shaped and has a depth of between about 30 and 200 microns and nominally about 50 microns. According to one embodiment in which passage 150 (shown in FIG. 4B) is formed by sawing, trench 164 has a minimum depth of 30 microns. According to another exemplary process in which passage 150 (shown in FIG. 4B) is formed using abrasive jet machining, trench 164 has a minimum thickness of 50 microns. Recessed surfaces 166 and 168 are at an angle of about 55 degrees relative to surface 154 such that the distance between edges 158 is approximately 230 microns. Passage 150 (shown in FIGS. 4A and 4B) is an elongate slot having a width of about 130 microns. Surfaces 176 and 178 (shown in FIG. 4C) on surface 152 are an angle β relative to surface 152 of between about 15-75 degrees and nominally 45 degrees.

Figure 5A:
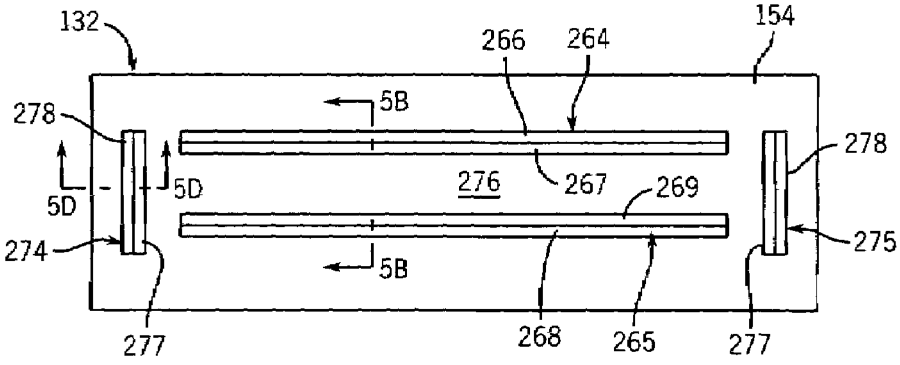
FIG. 5A is a top plan view of a portion of a substrate.
Figure 5B:
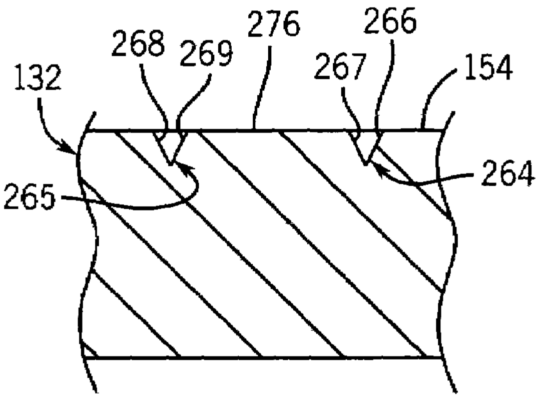
FIG. 5B is a sectional view of the substrate of FIG. 5A taken along line 5B-5B according to one exemplary embodiment.
Figure 5C:
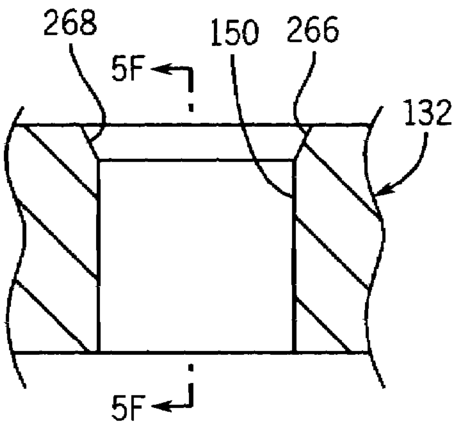
FIG. 5C is a fragmentary sectional view of a substrate illustrating formation of a second trench in the substrate of FIG. 5B according to one exemplary embodiment.
Figure 5D:
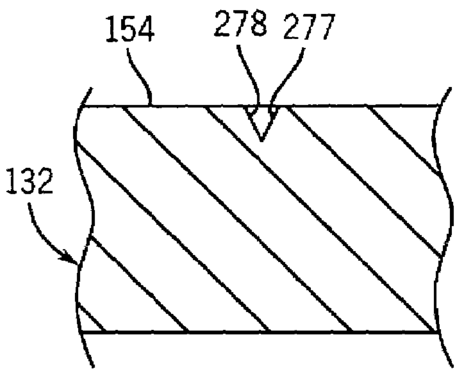
FIG. 5D is a fragmentary sectional view of the substrate of FIG. 5A taken along line 5D-5D according to one exemplary embodiment.

FIGS. 5A-5F illustrate another method for forming passages 150 through substrate 132 according to another embodiment. As shown by FIGS. 5A, 5B and 5D, the method includes removing portions of substrate 132 along face 154 to form trenches 264, 265, 274 and 275. Trenches 264 and 265 are formed in face 154 and are spaced apart from one another. Trenches 274 and 275 also extend into face 154 spaced apart from the ends of trenches 264 and 265. Trenches 274 and 275 are spaced apart form from one another and extend non-parallel to trenches 264 and 265. Trenches 264, 265, 274 and 275 substantially surround an intermediate area 276 of substrate 132. As shown by FIG. 5B, trench 264 includes recessed surfaces 266 and 267 while trench 265 includes recessed surfaces 268 and 269. Both surfaces 266 and 267 and surfaces 268 and 269 face one another. In one embodiment, each of recessed surfaces 266, 267, 268 and 269 extends at an angle of between 40 degrees and 75 degrees with respect to face 154. In one embodiment, surfaces 266, 267, 268 and 269 extend at an angle of approximately 55 degrees relative to surface 154 and have a depth of approximately 50 microns.

As shown by FIG. 5D, trench 274 extends into face 154 and includes recessed surfaces 277, 278. Surfaces 277 and 278 face one another and have a depth of approximately 50 microns. In one embodiment, surfaces 277 and 278 extend at an angle of between about 40 degrees and 75 degrees with respect to surface 154. In one embodiment, surfaces 277 and 278 extend at an angle of approximately 55 degrees with respect to surface 154. Trench 275 is substantially identical to trench 274.

Figure 5E:
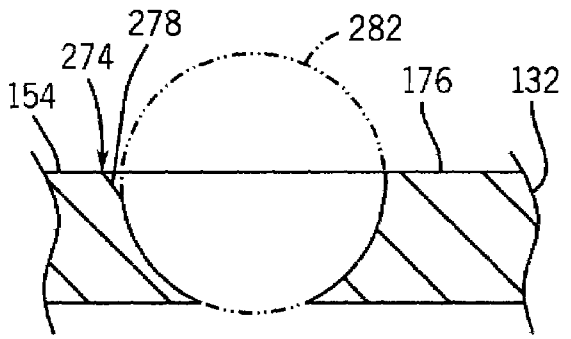
FIG. 5E is a fragmentary sectional view of the substrate of FIG. 5A illustrating formation of the passage of FIG. 5C according to one exemplary embodiment.
Figure 5F:
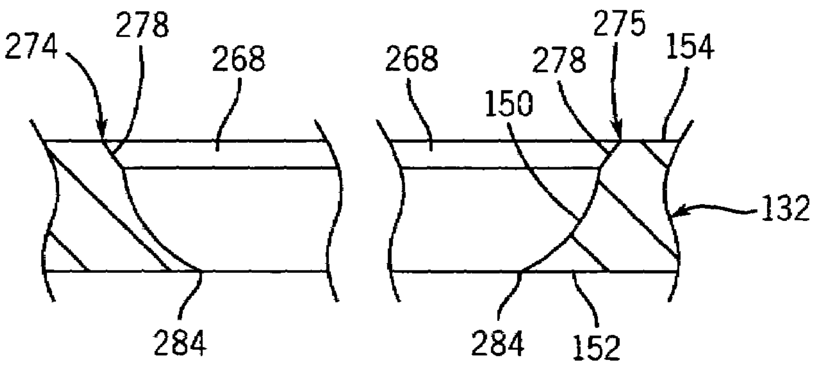
FIG. 5F is a fragmentary sectional view of the substrate of FIG. 5C taken along line 5F-5F according to one exemplary embodiment.

FIGS. 5C, 5E and 5F illustrate the removal of additional portions of substrate 132 to form passage 150 through substrate 132. In particular, portion 276 of substrate 132 (shown in FIGS. 5A and 5B) is removed to form passage 150 such that passage 150 is bordered on at least along part of opposite sides by recessed surfaces 266 and 268 of previously formed trenches 264 and 265. As shown by FIGS. 5E and 5F, portion 276 extending between trenches 274 and 275 is also removed such that passage 150 is also bordered at least along part of opposite sides by the outer recessed surface 278 of trenches 274 and 275. As a result, passage 150 is a substantially elongated slot bordered by recessed surfaces provided by each of trenches 264, 265, 274 and 275.

In the particular method illustrated by FIGS. 5A through 5F, trenches 264, 265, 274 and 275 are consistently and uniformly formed using a first material removal technique which forms recessed surface 266, 268 and 278 which serve as edges 158 of the final fluid passage 150. At the same time, removal of the bulk of substrate 132 (portion 276) to form passage 150 is performed by a different removal techniques that may be fast, efficient and relatively inexpensive. As a result, passage 150 may be quickly and inexpensively formed while providing passage 150 with reliable, consistent and smooth edges 158 formed by trenches 264, 265, 274 and 275. As noted above, these smooth, reliable and consistent edges 158 enable fluid drivers 142 (shown in FIG. 3) to be more closely and compactly positioned relative to one another and relative to edges 158 to reduce the cost and size of fluid ejection mechanism 130 and to increase fluid deposition rates.

According to one exemplary embodiment, trenches 264, 265, 274 and 275 are formed by a dry or wet etch material removal technique and passage 150 is formed by a cutting or sawing material removal technique. In particular, as shown in phantom in FIG. 5E, a rotating saw disk 282 is moved across portion 276 (shown in FIGS. 5A and 5B) to remove portion 276 and to form passage 150. The use of a rotating saw disk 282 results in the axial ends of passage 150 having a curvature substantially equal to the radius of saw disk 282. Removal of portion 276 with saw disk 282 is cost effective and fast. In addition, saw disk 282 is capable of forming extremely thin passages 150 without subjecting substrate 132 to high temperatures. Although disk 282 may subject resistors 132 to stresses, since edges 158 are formed by trenches 264, 265, 274 and 275 formed by etching such stresses are minimized.

Once passage 150 has been formed, additional portions of substrate 132 are removed along surface 152 adjacent to passage 150. For example, material may be removed in a fashion similar to that shown in FIG. 4C by a router or other material removal technique. Such removal of additional portions of substrate may be used to eliminate burrs 284, which may be performed in order to further strengthen substrate 132 near passage 150.

In one embodiment illustrated, saw blade 282 has a diameter of approximately 1 inch and a width such that the width of passage 150 is approximately 130 microns. In other embodiments, other saw blade diameters and widths may be employed.

Figures 6A, 6B, 6C:
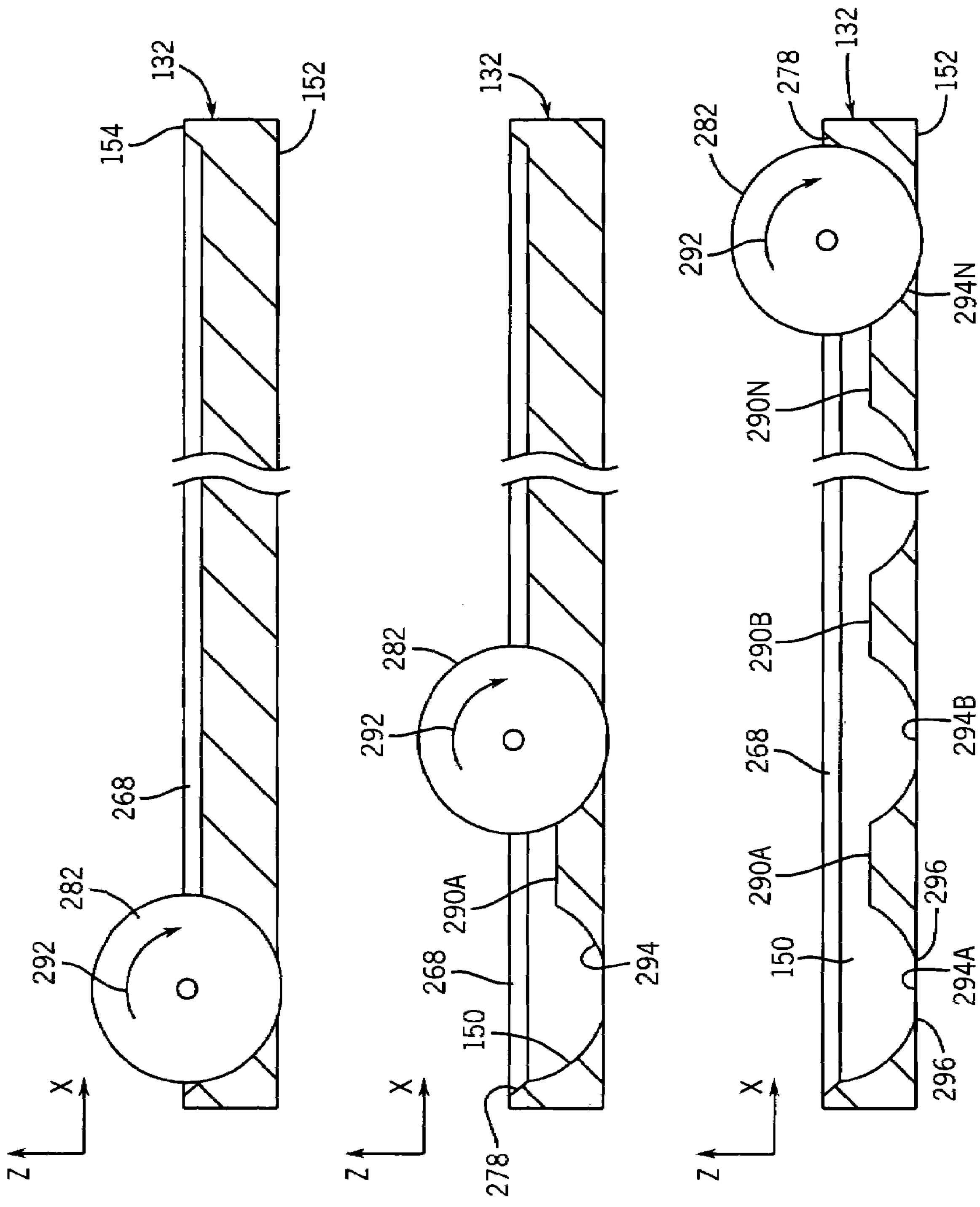
FIG. 6A is a sectional view of the substrate of either FIG. 4A or FIG. 5A illustrating formation of a passage according to one exemplary embodiment.
FIGS. 6B and 6C illustrate continued formation of the passage in the substrate of FIG. 6A according to one exemplary embodiment.

FIGS. 6A-6F schematically illustrate another method for forming passage 150 through substrate 132 according to another embodiment. Similar to the method described above with respect to FIGS. 5A-5F, portions of substrate 132 are initially removed to form trenches 264, 265, 274 and 275 (shown in FIGS. 5A). However, in lieu of saw blade 282 being plunged into substrate 132 along the Z axis and then being moved across substrate 132 along the X axis to remove portion 276 and to form passage 150, saw blade 282 is reciprocated along the Z axis while moving along the X axis to form ribs 290A-290N (shown in FIGS. 6C-6F). In particular, as shown by FIG. 6A, saw blade 282 is initially plunged into portion 276 between trenches 264 and 265 proximate to trench 274 while rotating in the direction indicated by arrow 292. Saw blade 282 removes portion 276 of substrate 132 to form portion 294A of passage 150. Portion 294A extends completely through substrate 132 and is bordered by recessed surface 264, recessed surface 274 and recessed surface 265 (shown in FIG. 5A). As shown by FIG. 6B, saw blade 282 is moved in the positive Z direction and is then moved in the positive X direction to remove a portion of the thickness of substrate 132 in some areas and all of the thickness in others. This results in the formation of rib 290A. After being moved a distance in the positive X direction, saw blade 282 is once again lowered in the negative Z direction to cut completely through substrate 132 and to form portion 294B of passage 150. This process is repeated until saw blade 182 reaches trench 275, wherein the final portion 294N of passage 150 is bordered by recessed surface 278 of trench 275.

Figure 6D:
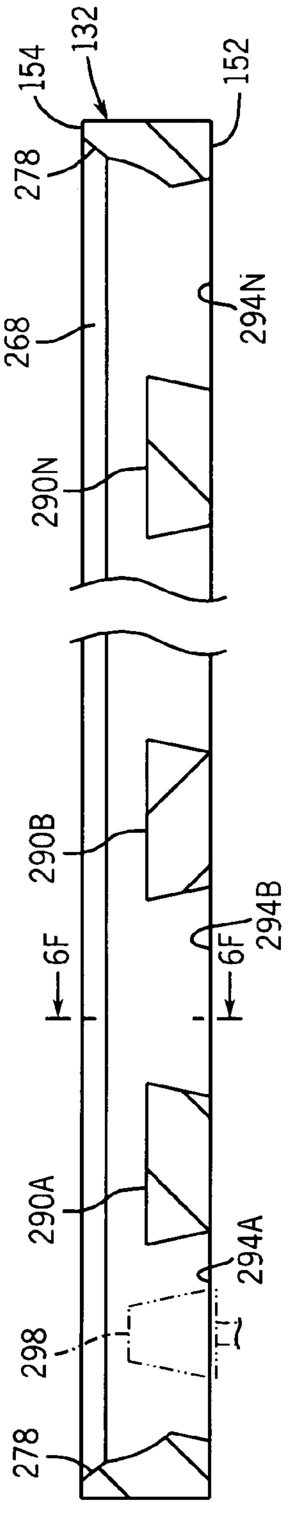
FIG. 6D illustrates the substrate of FIG. 6C after additional portions of the substrate have been removed according to one exemplary embodiment.
Figure 6E:
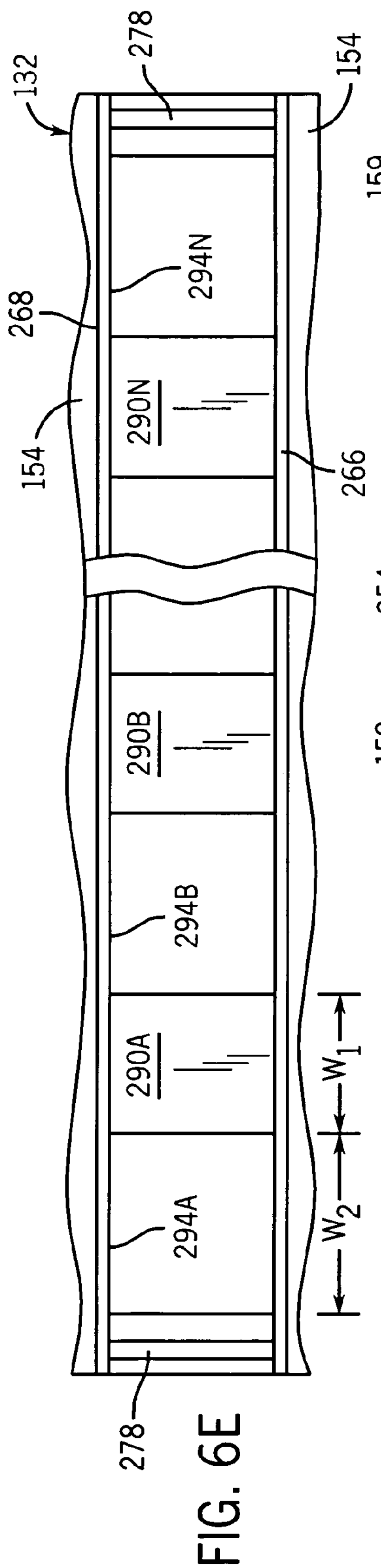
FIG. 6E is a top plan view of the substrate of FIG. 6D according to one exemplary embodiment.
Figure 6F:
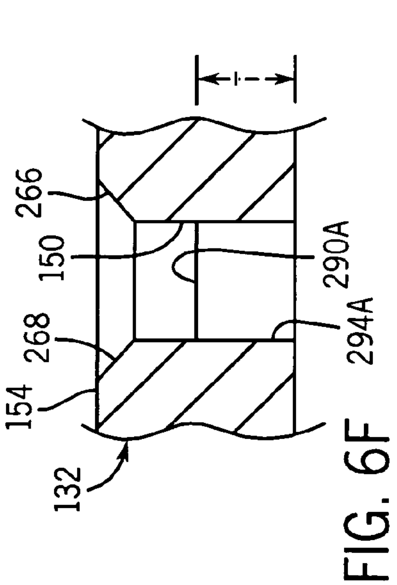
FIG. 6F is a sectional view of the substrate of FIG. 6D taken along line FIG. 6F-6F according to one exemplary embodiment.

As shown by FIGS. 6D, 6E and 6F, additional portions of substrate 132 along face 152 are further removed. In particular, floor edges or burrs 296 bordering portions 294A-294N of passage 150 are removed to widen portions 294A-294N of passage 150 adjacent face 152 of substrate 132. The removal of burrs 296 eliminates points of high stress concentrations or potential crack sites in substrate 132. Moreover, the removal of burrs 296 forms tapers along face 152 that better enables substrate 132 to accommodate warping without stress buildup and potential cracking. As shown by FIG. 6D, in the embodiment shown, burrs 296 are removed with a rotating router 298 (shown in phantom) extending into substrate 132 from face 152. In other embodiments, burrs 296 at each of portions 294A-294N may be removed using other material removal techniques such as abrasive jet machining (AJM), abrasive flow machining (AFM), wet etch, and dry etch.

As shown by FIGS. 6E and 6F, ribs 294A-294N extend across passage 150 between portions 294A-294N. According to one exemplary embodiment, ribs 290A-290N each has a longitudinal width $W_1$, of between about 10 percent to 50 percent of total trench 164 length and nominally of about 20 percent of total trench 164 length. In one particular embodiment, ribs 290A-290N each has a longitudinal width $W_1$ of between about 1 mm and 10 mm and nominally of about 5 mm. According to one exemplary embodiment, ribs 290A-290N each has a thickness T of between 10 percent to 90 percent of thickness of substrate 132 and nominally of about 50 percent of thickness of substrate 132. In one embodiment, each of ribs 290A-290N has a thickness T of between about 0.1 mm and about 0.6 mm, and nominally of about 0.3 mm.

In one particular embodiment, ribs 290A-290N are uniformly spaced along passage 150 and substantially extend adjacent to face 152. In other embodiments, ribs 290A-290N may be non-uniformly spaced along passage 150 and may have other locations intermediate faces 152 and 154. Although FIGS. 6D and 6E illustrate at least three ribs 290A-290N, substrate 132 may alternatively include a greater or fewer number of such ribs. For example, in one embodiment, substrate 132 may include a single rib or two ribs. In another embodiment, substrate 132 may omit ribs along passage 150.

According to one exemplary embodiment, portions 294A-294N of passage 150 extending between ribs 290A-290N each have an axial width $W_2$ of between about 10 percent to 90 percent of total length of trench 164 and nominally at 20 percent. In one particular embodiment, portions 294A-294N have an axial width $W_2$ of between about 1 mm and about 10 mm, and nominally of about 5 mm. The overall dimensions of ribs 290A-290N and of portions 294A-294N of passage 150 are configured to reduce stress and to increase the strength of edges 158 while facilitating adequate fluid flow through passage 150 and through portions 294A-294N.

Figure 8:
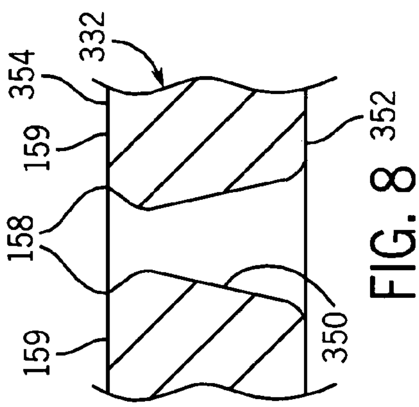
FIG. 8 is a fragmentary sectional view of one example of a passage profile through a substrate according to one exemplary embodiment.
Figure 9:
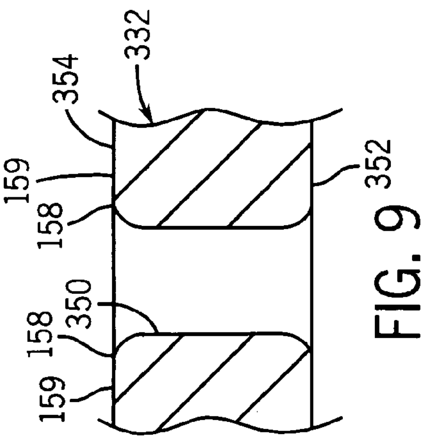
FIG. 9 is a fragmentary sectional view of another example of a passage profile through a substrate according to one exemplary embodiment.
Figure 7A:
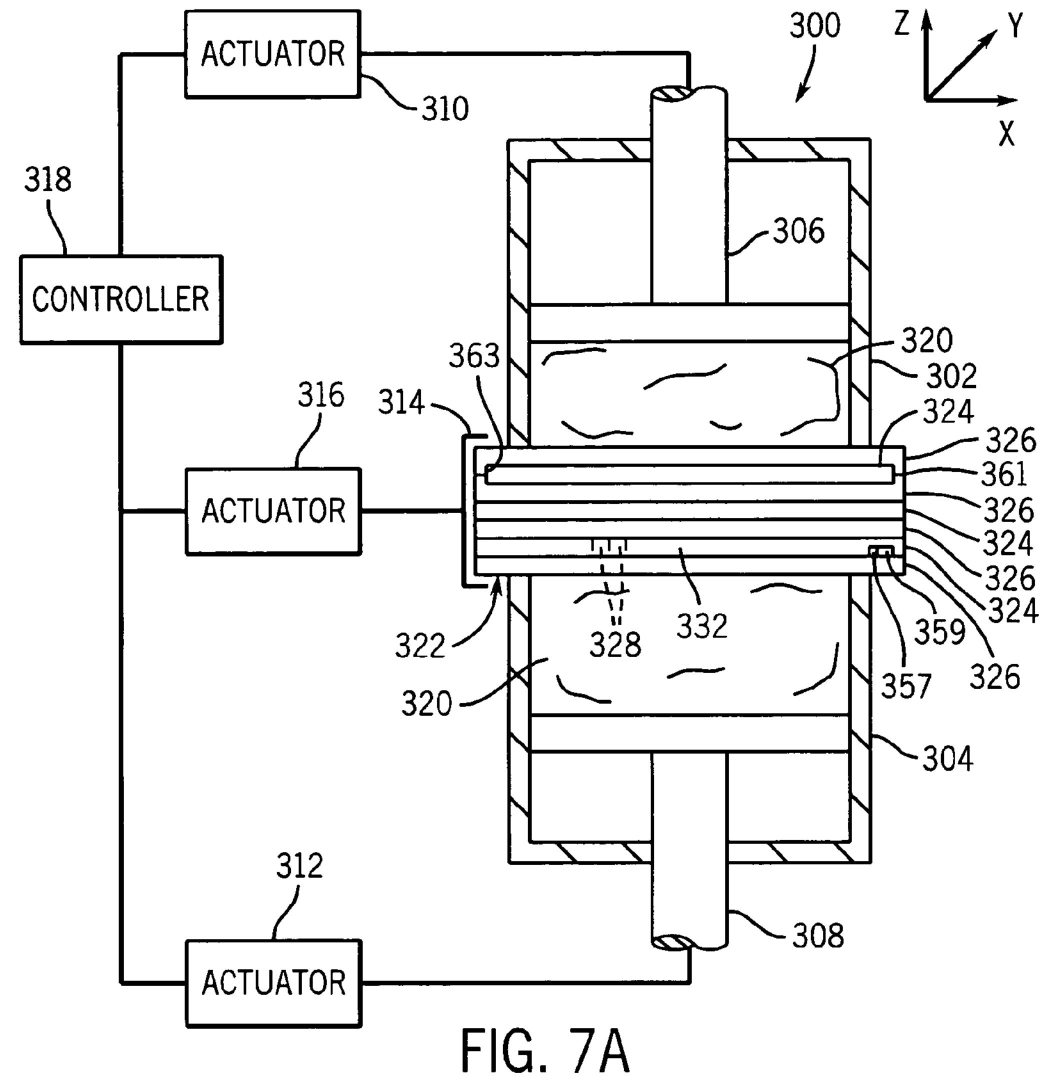
FIG. 7A is a sectional view schematically illustrating a system for refining a substrate according to one exemplary embodiment.

FIGS. 7-9 illustrate a method for further forming passage 150 through substrate 332. FIG. 7A schematically illustrates system 300 configured to form passages in one or more substrates 132. The substrates of 132 can be made of silicon, glass, ceramic and like. The thickness of substrates 132 can be between 200 microns to 5000 microns and nominally at 675 microns. The shapes of substrate 132 can be circular, square or rectangular. System 300 substantially includes cylinders 302, 304, pistons 306, 308, actuators 310, 312, fixture 314, actuator 316 and controller 318. Cylinders 302 and 304 extend opposite one another and are configured to contain a viscous abrasive particle containing medium 320. Pistons 306 and 308 extend within cylinders 302 and 304, respectively, and are configured to move within cylinders 302 and 304, respectively, to move medium 320 between cylinders 302 and 304 across a multi-substrate assembly 322. Actuators 310 and 312 comprise mechanisms coupled to pistons 306 and 308 and are configured to drive pistons 306 and 308 in positive or negative Z axis directions in response to control signals from controller 318. In one particular embodiment, pistons 306 and 308 are configured as part of actuator 310 and 312 which comprise hydraulic or pneumatic piston-cylinder assemblies. In other embodiments, actuators 310 and 312 may comprise other mechanisms such as solenoids or other electrical or mechanical mechanisms configured to reciprocate a piston.

Multi-substrate assembly 322 includes substrate panels 324 and masks 326. Panels 324 be in the form of a wafer, a rectangular panel or a custom shape. Panels 324 include a plurality of individual dies 328 (schematically shown in phantom) which are formed together to form each wafer. Each die 328 includes a substrate 332 having one or more passages 350. According to one exemplary embodiment, each die 328 additionally includes fluid drivers 142 (shown in FIG. 3) formed upon substrate 332 and their associated electrically conductive traces and one or more barriers 144 (shown in FIG. 3) upon substrate 332.

Passages 350 extend through each substrate 332. In one embodiment, each passage 350 is substantially identical to passage 150 described above and may be formed by the same technique described above. In other embodiments, each passage 350 is formed using other processes as well as other material removal techniques or combinations thereof.

Figure 7B:
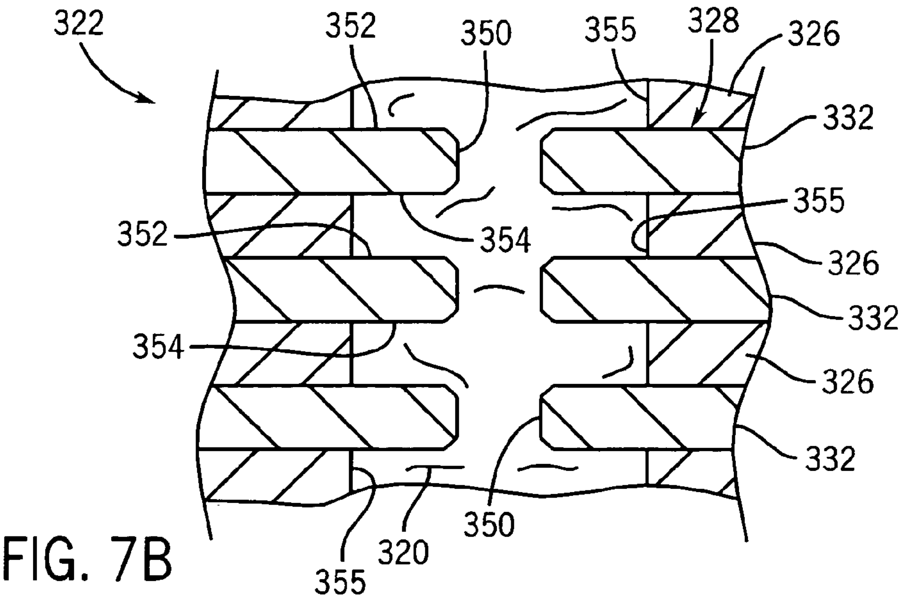
FIG. 7B is an enlarged fragmentary sectional view of a multi-substrate assembly being refined by the system of FIG. 7A according to one exemplary embodiment.

Masks 324 generally comprise structures configured to extend adjacent to opposite faces 352 and 354 of substrates 332 (and/or the one or more barrier layers along substrate 332) so as to protect selected portions of faces 352 and 354 of substrate 332 and so as to guide and direct flow of medium 320 through passages 350. Each mask 326 includes a plurality of openings 355 corresponding to the plurality of passages 350 through substrate 332. As shown by FIG. 7B, masks 326 are positioned on opposite faces of end-most substrates 332 and are further positioned between consecutive substrates 332 with openings 355 substantially aligned with their corresponding passages 350 of substrate 332.

In one embodiment, masks 326 are specifically configured to facilitate the alignment of openings 355 with passage 350. For example, according to one exemplary embodiment, portions of each panel 324 may include a detent 357 while corresponding portions of mask 326 include a detent engaging projection 359, wherein the detent 357 and detent engaging projection 359 substantially mate with another to align an adjacent wafer and adjacent mask. This relationship between the detent 357 and the detent engaging projection 359 may be reversed such that mask 326 includes a detent while panel 324 includes a detent engaging projection.

In still other embodiments, mask 326 may be configured to completely surround or at least partially surround the peripheral edges of an adjacent panel 324 such that mask 326 abuts opposite edges of panel 324 to retain panel 324 against movement in at least one direction and to assist in aligning openings 355 with passages 350. For example, as shown by FIG. 7A, one or more of masks 326 may include peripheral lips 361 configured to abut peripheral edges 363 of adjacent panel 324. In still other applications, other techniques may be employed for aligning openings 355 with their corresponding passages 350. In still other embodiments, panels 324 and masks 326 may be held in alignment with one another by fixture 314.

Fixture 314 comprises a device configured to grasp and retain multi-substrate assembly 322 in place between cylinders 302 and 304 as medium 320 passes across assembly 322. Fixture 314 retains each of panels 324 and masks 326 together. In one embodiment, fixture 314 is coupled to one or both of cylinders 302 and 304. In another embodiment, fixture 314 may comprise an independent structure. In one embodiment, panels 324 and masks 326 are additionally bonded or adhered to one another. For example, in one application, panels 324 and masks 326 are bonded to one another with a protective coating or adhesive such as a polyvinyl alcohol. The coating provides additional protection for each panel 324 and facilitates easy cleaning of each panel 324 after operation by system 300. In other applications, other coatings may be employed or such coatings may be omitted.

Actuator 316 is coupled to fixture 314 and is communication with controller 318. Actuator 316 moves multi-substrate assembly 322 in response to signals from controller 318. Actuator 316 comprises an electric motor driven actuator with the appropriate cams and linkages to move multi-substrate assembly 322 in a desired fashion. In other embodiments, actuator 316 may include other actuation mechanisms such as hydraulic or pneumatic pistons-cylinder assemblies, electric solenoids and the like. In one embodiment, actuator 316 is configured to oscillate multi-substrate assembly 322 in the X axis direction, the Y axis direction or randomly along both axes. In still another embodiment, actuator 316 is configured to rotate assembly 322 in the X-Y plane. In still another embodiment, actuator 316 is configured to vibrate assembly 322 in the Z axis direction. Actuator 316 moves assembly 322 to control the shape of passages 350 produced by movement of medium 320 across panels 324. In other embodiments, actuator 316 may be omitted, wherein assembly 322 is held stationary between cylinders 302 and 304.

Controller 318 comprises a processor unit in communication with actuators 310, 312 and 316. Controller 318 generates control signals which cause actuator 316 to oscillate, rotate, vibrate or hold assembly 322 stationary. Controller 318 further generates control signals which cause actuators 310 and 312 to move pistons 306 and 308 within cylinders 302 and 304, respectively, to flow medium 320 through passages 350 of panels 324. According to one exemplary method, material 320 is passed through passages 350 in a single direction in the Z axis. In another embodiment, pistons 306 and 308 are reciprocated such that medium alternately flows through passages 350 in both directions along the Z axis. As medium 320 flow through passages 350, medium 320 removes burrs along passages 350 and smoothes edges of passages 350. By further smoothing or shaping of the edges along recessed surfaces 166 and 168 (shown in FIG. 3), system 300 strengthens each substrate 332 about passages 350 and enables fluid drivers 142 (shown in FIG. 3) to be more compactly located upon substrate 332 in closer proximity to the edges of passages 350. As discussed above, this enables more dies 328 to be provided on a single panel 324, reducing the cost of each individual die 328, and further enhances the speed at which fluid may be deposited upon a medium.

Although multi-substrate assembly 322 is illustrated as alternating panels 324 and masks 326, assembly 322 may alternatively include a pair of masks 326 sandwiching each individual panel 324. Although assembly 322 is illustrated as having faces 352 of each substrate 332 facing faces 354, assembly 322 may alternatively be arranged such that faces 352 face one another while faces 354 also face one another.

According to one exemplary embodiment, medium 320 includes abrasive materials such as aluminum oxide, silicon carbide, boron carbide and diamond. Such abrasive particles are suspended in a liquid agent so as to rub against substrate 332 to remove portions of substrate 332. The abrasive materials may have particle sizes ranging from 5 microns to 200 microns and nominally of about 20 microns. Masks 326 are formed from abrasive resistant materials in those areas contacted by medium 320. Examples of such abrasive resistant materials include hardened steel, ceramic and urethane.

FIGS. 8 and 9 illustrate distinct profiles of passage 350 through substrates 332 formed by system 300 with varying differential pressures and displacements of medium 320. For example, FIG. 8 illustrates a non-uniform pressure and directional flow of medium 320 through passage 350 so as to provide passage 350 with a tapered profile. FIG. 9 illustrates a uniform pressure and directional flow of medium 320 such that passage 350 has a substantially straight or linear profile. By varying the pressure and displacement of medium 320, system 300 may also vary the extent to which the edges along faces 354 and 352 are polished and de-burred.

Overall, system 300 enables large quantities of panels 324, including multitudes of individual dies 328, to be simultaneously treated to de-burr and smooth edges of fluid passages without subjecting the substrate of the dies to high degrees of heat or large forces which would otherwise weaken or potentially damage such substrates. As a result, the handling of individual panels 324 is minimized and cost savings are achieved. Moreover, the edges of the passages of such substrates are consistently and uniformly treated, enabling more compact arrangements of fluid drivers or other components upon such substrates and enabling faster printing or fluid deposition speeds.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method for forming an opening through a substrate, the method comprising:

removing a first portion of a first face of the substrate to form a first recessed surface oblique to the first face with a first material removal technique that imposes a first stress upon the substrate; and removing a second portion of the substrate forming a part of and extending from the first surface to a second opposite face of the substrate with a second material removal technique that imposes a second greater stress upon the substrate while forming a first passage extending through the substrate and across the previously formed first surface such that the first passage is bordered by the first surface, wherein the second portion of the substrate is removed beginning on a side adjacent to the first face, wherein the first portion is removed by etching and wherein the second portion is subsequently removed by a cutting process.

2. The method of claim 1, wherein the first portion of the first face is removed such that a second recessed surface is formed and wherein the second portion is removed such that the first passage is bordered by the second recessed surface.

3. The method of claim 2, including removing a third portion of a second opposite face of the substrate to form a third recessed surface oblique to the second opposite face of the substrate, wherein the second portion is removed such that the first passage is bordered by the third recessed surface.

4. The method of claim 3, wherein removal of a third portion forms a fourth recessed surface on the second face, and wherein the first passage formed by removal of the second portion is bordered by the fourth recessed surface.

5. The method of claim 4, wherein the third portion is removed using a router.

6. The method of claim 5, wherein the third portion is removed after removal of the second portion.

7. The method of claim 1, wherein removal of the first portion forms a second recessed surface opposite the first recessed surface, and wherein the method includes removing a third portion of the substrate along the first face prior to removal of the second portion to form a third recessed surface spaced from the first recessed surface and the second recessed surface, wherein the first passage is formed so as to be bordered by the third recessed surface.

8. The method of claim 1, wherein removal of the first portion forms a second recessed surface opposite the first recessed surface, and wherein the method further includes removing a third portion of the substrate along the first face prior to removal of the second portion to form a third recessed surface extending nonparallel to the first recessed surface, wherein the passage is formed so as to be bordered by the third recessed surface.

9. The method of claim 1, wherein the passage is an elongated slot extending through the substrate.

10. The method of claim 1, wherein the removal of the second portion forms at least one rib along the passage recess from the first face.

11. The method of claim 10, wherein the second portion is removed by a rotating saw blade.

12. The method of claim 1, including smoothing surfaces bordering the passage while substantially maintaining the shapes of the surfaces.

13. The method of claim 1, wherein the second portion is removed by abrasive jet machining.

14. The method of claim 1, wherein removal of the first portion forms a second recessed surface along the first face opposite the first recessed surface, and wherein the method further includes:

removing a third portion of the first face of the substrate prior to removal of the second portion to form a third recessed surface and a fourth recessed surface opposite the third recessed surface, wherein the third recessed surface and the fourth recessed surface are spaced from the first recessed surface and the second recessed surface;

removing a fourth portion of the first face of the substrate prior to removal of the second portion to form a fifth recessed surface and a sixth recessed surface opposite the fifth recessed surface, wherein the fifth recessed surface and the sixth recessed surface extend nonparallel to the first recessed surface and the second recessed surface; and removing a fifth portion of the substrate along the first face prior to removal of the second portion to form a seventh recessed surface and an eighth recessed surface opposite the seventh recessed surface, wherein the seventh recessed surface and the eighth recessed surface extend nonparallel to the first recessed surface and the second recessed surface, and wherein removal of the second portion is such that the passage is bordered by the first recessed surface, third recessed surface, fifth recessed surface and the seventh recessed surface.

15. The method of claim 1, wherein the recessed surface is inclined at an angle of between about 35 degrees and about 75 degrees.

16. The method of claim 1, wherein the first recessed surface has a depth of at least about 30 microns.

17. The method of claim 16, wherein the passage has a width no greater than 400 microns.

18. The method of claim 1, wherein the first passage has a width of no greater than 130 microns.

19. The method of claim 1, wherein the first portion is removed using a wet etch.

20. A method of forming a passage through a dielectric substrate, the method comprising:

forming a first recessed surface on a first face of the dielectric substrate and oblique to the first face;

forming a second recessed surface on the first face of the dielectric substrate substantially facing the first recessed surface and oblique to the first face;

forming a passage through the dielectric substrate by removing material from the dielectric substrate beginning on a side adjacent to the first face, wherein the first recessed surface and the second recessed surface are configured to border opposite sides of the passage;

coupling a fluid reservoir to the dielectric substrate; and forming fluid drivers on the substrate, wherein the substrate is between the fluid reservoir and the fluid drivers.

21. The method of claim 20, wherein the first recessed surface and the second recessed surface are formed by forming a first trench including the first recessed surface and forming a second trench including the second recessed surface.

22. The method of claim 21, wherein the first surface extends along a first axis, wherein the second surface extends along a second axis parallel to the first surface and wherein the method further includes forming a third recessed surface extending along a third axis nonparallel to the first axis.

23. The method of claim 22, wherein the third recessed surface extends along the third axis perpendicular to the first axis.

24. The method of claim 23, including forming a fourth recessed surface facing the third recessed surface.

25. The method of claim 24, wherein the third recessed surface extends along the third axis perpendicular to the first axis.

26. The method of claim 24, including forming a fourth recessed surface facing the third recessed surface.

27. The method of claim 21, including forming a third recessed surface and a fourth recessed surface on the first face of the substrate, wherein the third recessed surface and the fourth recessed surface extend nonparallel to the first recessed surface and the second recessed surface, and wherein the third surface and the fourth surface border sides of the passage.

28. The method of claim 21, wherein the first recessed surface and the second surface are formed using a wet etch.

29. The method of claim 21 wherein the first recessed surface and the second recessed surface is inclined at an angle of between about 35 degrees to about 75 degrees.

30. The method of claim 21, wherein the first recessed surface has a depth of at least about 20 microns.

31. The method of claim 21, wherein the first recessed surface is formed between a first set of fluid drivers and a second set of fluid drivers on the first face of the substrate.

32. The method of claim 21, wherein the substrate includes a pair of spaced chambers wherein the first recessed surface and the second recessed surface are formed between a pair of spaced chambers.

33. A method for forming a printhead, the method comprising:

stacking substrates so as to align passages extending through each substrate;

flowing an abrasive media through the aligned passages; and separate the subject from the stack.

34. The method of claim 33, including separating each substrate into a plurality of dies.

35. The method of claim 33, including positioning a mask adjacent a substrate surface.

36. The method of claim 35, including locating an opening of the mask over one of the passages along the substrate surface.

37. The method of claim 33, including positioning a mask between consecutive substrates.

38. The method of claim 37, including locating an opening of the mask over a passage in each of the consecutive substrates.

39. The method of claim 33, wherein flowing the abrasive media through the aligned passages includes flowing the abrasive media through the passages in a first direction and flowing the abrasive media through the passage in a second opposite direction.

40. The method of claim 33, wherein the abrasive material directed to flow between sets of fluid drivers formed upon each substrate.

41. The method of claim 40, including positioning a mask adjacent a substrate surface over fluid drivers on the substrate.

42. The method of claim 33, wherein the substrates each include electrically conductive traces on at least one surface.

43. A method for forming an opening through a substrate, the method comprising:

etching a first portion of a face of the substrate to form a recessed surface oblique to the face; and removing a second portion of the substrate with a rotating saw blade to form a passage extending through the substrate, wherein the passage is bordered by the surface.

44. The method of claim 1, wherein the first recessed surface is adjacent the first face and faces away from the second opposite face of the substrate.

45. The method of claim 1, wherein the second portion is removed with a rotating saw blade.

46. The method of claim 43, wherein the removal of the second portion forms a least one rib along the passage recessed from the face.

47. A method for forming an opening through a substrate, the method comprising:

removing a first portion of a first face of the substrate to form a first recessed surface oblique to the first face with a first material removal technique that imposes a first stress upon the substrate;

removing a second portion of the substrate forming a part of and extending from the first surface to a second opposite face of the substrate with a second material removal technique that imposes a second greater stress upon the substrate while forming a passage extending through the substrate and across the previously formed first surface such that the passage is bordered by the first surface along the first face, wherein removal of the first portion forms a second recessed surface opposite the first recessed surface; and removing a third portion of the substrate along the first face prior to removal of the second portion to form a third recessed surface spaced from the first recessed surface and the second recessed surface, wherein the passage is formed so as to be bordered by the third recessed surface along the first face and to continuously extend adjacent to and along the first face from the first recessed surface to the third recessed surface, wherein removal of the third portion forms a fourth recessed surface opposite the third recessed surface, wherein the third recessed surface and the fourth recessed surface are spaced from the first recessed surface and the second recessed surface;

removing a fourth portion of the first face of the substrate prior to removal of the second portion to form a fifth recessed surface and a sixth recessed surface opposite the fifth recessed surface, wherein the fifth recessed surface and the sixth recessed surface extend nonparallel to the first recessed surface and the second recessed surface; and removing a fifth portion of the substrate along the first face prior to removal of the second portion to form a seventh recessed surface and an eighth recessed surface opposite the seventh recessed surface, wherein the seventh recessed surface and the eighth recessed surface extend nonparallel to the first recessed surface and the second recessed surface, and wherein removal of the second portion is such that the passage is bordered by the first recessed surface, third recessed surface, fifth recessed surface and the seventh recessed surface and continuously extends adjacent to and along the first face between the first recessed surface, third recessed surface, fifth recessed surface and the seventh recesses.

48. A method for forming an opening through a substrate, the method comprising:

providing the substrate, wherein the substrate is selected from a group of dielectric materials consisting of silicon, glass and ceramics;

removing a first portion of a first face of the substrate to form a first recessed surface oblique to the first face with a first material removal technique that imposes a first stress upon the substrate;

removing a second portion of the substrate forming a part of and extending from the first surface to a second opposite face of the substrate with a second material removal technique that imposes a second greater stress upon the substrate while forming a first passage extending through the substrate and across the previously formed first surface such that the first passage is bordered by the first surface, wherein the first portion of the first face is removed such that a second recessed surface is formed and wherein the second portion is removed such that the first passage is bordered by the second recessed surface; and removing a third portion of a second opposite face of the substrate to form a third recessed surface, wherein the second portion is removed such that the first passage is bordered by the third recessed surface.

49. The method of claim 48, wherein removal of a third portion forms a fourth recessed surface on the second face, and wherein the first passage formed by removal of the second portion is bordered by the fourth recessed surface.

50. The method of claim 49, wherein the third portion is removed using a router.

51. The method of claim 50, wherein the third portion is removed after removal of the second portion.

52. A method of forming a passage through the substrate, the method comprising:

forming a first recessed surface on a first face of the substrate and oblique to the first face;

forming a second recessed surface on the first face of the substrate substantially facing the first recessed surface and oblique to the first face; and forming a passage through the substrate by removing material from the substrate beginning on a side adjacent to the first face, wherein the first recessed surface and the second recessed surface are configured to border opposite sides of the passage, wherein the first recessed surface and the second recessed surface are formed by forming a first trench including the first recessed surface and forming a second trench including the second recessed surface.

53. The method of claim 52, wherein the first surface extends along a first axis, wherein the second surface extends along a second axis parallel to the first surface and wherein the method further includes forming a third recessed surface extending along a third axis perpendicular to the first axis.

54. The method of claim 53, including forming a fourth recessed surface facing the third recessed surface.

55. The method of claim 52, wherein the first recessed surface is formed between a first set of fluid drivers and a second set of fluid drivers on the first face of the substrate.

* * * * *

UNITED STATES PATENT AND TRADEMARK OFFICE

CERTIFICATE OF CORRECTION

PATENT NO. : 7,429,335 B2
APPLICATION NO. : 10/834462
DATED : September 30, 2008
INVENTOR(S) : Shen Buswell It is certified that error appears in the above-identified patent and that said Letters Patent is hereby corrected as shown below:

In column 5, line 1, after “inlet” insert -- 156 of --.

In column 14, line 16, in Claim 10, delete “recess” and insert -- recessed --, therefor.

In column 15, line 58, in Claim 33, delete “separate the subject” and insert -- separating the substrates --, therefor.

In column 16, line 29, in Claim 46, delete “a least” and insert -- at least --, therefor.

Signed and Sealed this

Twenty-first Day of April, 2009

JOHN DOLL

*Acting Director of the United States Patent and Trademark Office*